No. 848,778. PATENTED APR. 2, 1907.
W. W. SPADONE.
HOSE.
APPLICATION FILED NOV. 2, 1905.
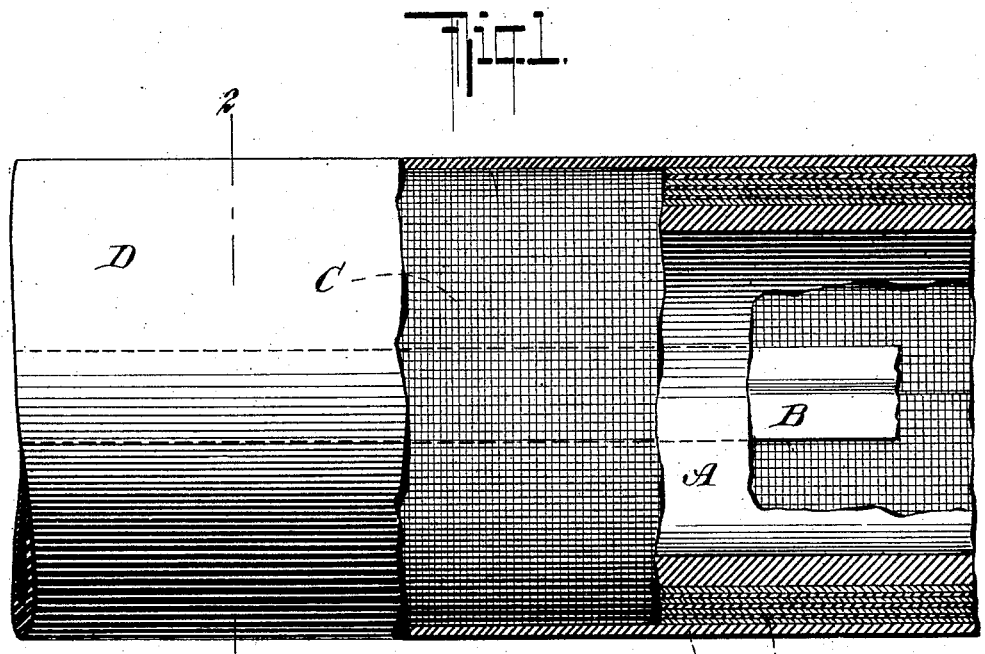
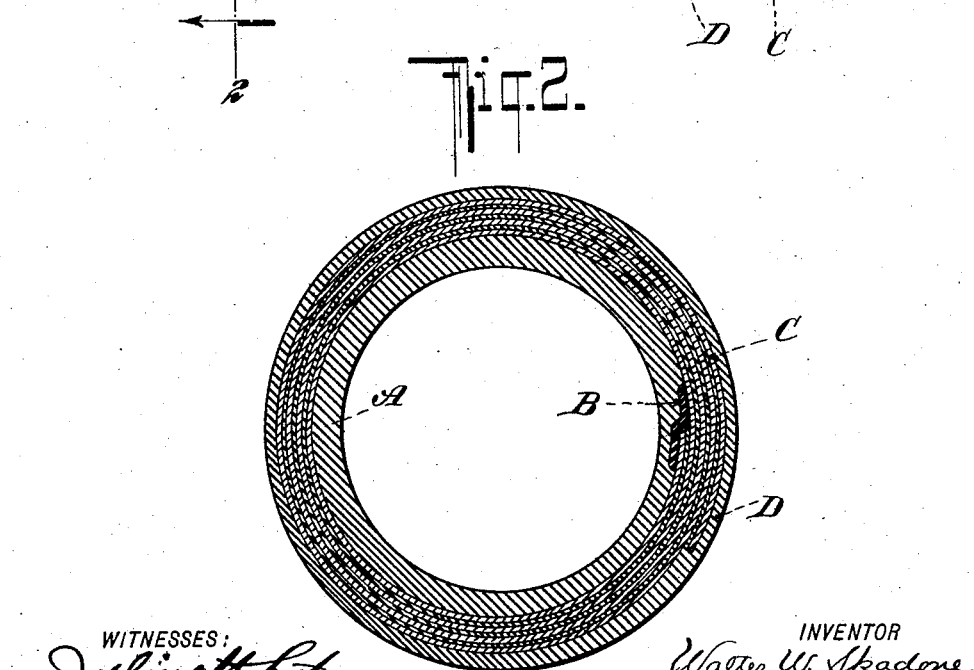
WITNESSES:
INVENTOR
Walter W. Spadone
BY
Briesen & Knauth
ATTORNEYS

UNITED STATES PATENT OFFICE.

WALTER W. SPADONE, OF NEW YORK, N. Y., ASSIGNOR TO THE GUTTA PERCHA & RUBBER MANUFACTURING COMPANY, OF NEW YORK, N. Y., A CORPORATION OF NEW YORK.

HOSE.

No. 848,778. Specification of Letters Patent. Patented April 2, 1907.

Application filed November 2, 1905. Serial No. 285,576.

*To all whom it may concern:*

Be it known that I, WALTER W. SPADONE, a citizen of the United States, and a resident of the borough of Brooklyn, county of Kings, city and State of New York, have invented certain new and useful Improvements in Hose, of which the following is a specification.

My invention relates to rubber hose, and has for its object to provide hose of this description with a reinforcing-strip for the purposes to be clearly described hereinafter.

The features of novelty will be pointed out in the appended claims.

Reference is to be had to the accompanying drawings, in which—

Figure 1 is a side view, partly in section and with parts broken away, of a hose with my improvements applied thereto; and Fig. 2 is a cross-section thereof on the line 2 2 of Fig. 1.

A represents the inner tube, of rubber or similar material.

B is a strip of rubber, usually of a contrasting color, which extends throughout the length of the hose.

C is the wrapping of duck or like fabric, and D is the outer covering of rubber or like material.

The inner tube A is manufactured in the usual manner, and while said inner tube A is still in a plastic condition the inforcing-strip B is placed along said tube, and the duck C is then wound or coiled around said tube A, it being understood that the winding of the duck is commenced at the strip B. After the duck has been wound around in as many thicknesses as is desired the outer covering D is applied. Thus the strip B serves to prevent the end of the duck or other fabric from wearing or working through the tube A, it being understood that the strip B is composed of a purer, better, and stronger grade of material than that of the remainder of the tube A. By placing said strip B on the tube A when said tube is in a plastic condition the strip becomes practically part of the said tube. In order that the workman will have no difficulty locating the strip B for the purpose of commencing the winding of the duck at the proper point, the said strip is made in a color which contrasts with the color of the tube A.

It is obvious that while I have described my invention as applied to rubber hose it may be used as well in other tubular rubber articles—as, for instance, rubber tires.

Various modifications may be made without departing from the nature of my invention as brought out in the claims.

I claim—

1. A tubular rubber article having an inner layer of rubber, a reinforcing-strip applied longitudinally on the outer surface of said inner layer and permanently connected therewith, a layer of fabric wrapped or coiled around said inner layer and reinforcing-strip, with the inner end of said wrapped layer in engagement with the reinforcing-strip, and an outer layer of rubber in which said fabric layer is embedded, all the parts of said rubber article being permanently connected to form a unitary article.

2. A tubular rubber article having an inner layer of rubber, a reinforcing-strip, of a color contrasting with that of the said layer, applied longitudinally on the outer surface of said inner layer and permanently connected therewith, a layer of fabric wrapped or coiled around said inner layer and reinforcing-strip, with the inner end of said wrapped layer in engagement with the reinforcing-strip, and an outer layer of rubber in which said fabric layer is embedded, all the parts of said rubber article being permanently connected to form a unitary article.

In testimony whereof I have hereunto set my hand in the presence of subscribing witnesses.

WALTER W. SPADONE.

Witnesses:
TERENCE J. MORRIS,
JAS. S. HIGGINS.